United States Patent [19]

Ron et al.

[11] 4,292,265

[45] Sep. 29, 1981

[54] METHOD FOR PREPARING POROUS METAL HYDRIDE COMPACTS

[75] Inventors: Moshe Ron, Haifa, Israel; Dieter M. Gruen, Downers Grove, Ill.; Marshall H. Mendelsohn, Woodridge, Ill.; Irving Sheft, Oak Park, Ill.

[73] Assignee: The United States of America as represented by the United States Department of Energy, Washington, D.C.

[21] Appl. No.: 113,873

[22] Filed: Jan. 21, 1980

[51] Int. Cl.$^3$ ............................................. C04B 15/14
[52] U.S. Cl. ..................................... 264/82; 264/111; 264/122
[58] Field of Search .......................... 264/111, 122, 82

[56] References Cited

U.S. PATENT DOCUMENTS 3,803,043  4/1974  Magladry et al. .................. 264/111
3,926,671 12/1975  Gutjahr .............................. 264/111

Primary Examiner—Donald E. Czaja
Assistant Examiner—James R. Hall
Attorney, Agent, or Firm—James W. Weinberger; Richard G. Besha; James E. Denny

[57] ABSTRACT

A method for preparing porous metallic-matrix hydride compacts which can be repeatedly hydrided and dehydrided without disintegration. A mixture of a finely divided metal hydride and a finely divided matrix metal is contacted with a poison which prevents the metal hydride from dehydriding at room temperature and atmospheric pressure. The mixture of matrix metal and poisoned metal hydride is then compacted under pressure at room temperature to form porous metallic-matrix hydride compacts.

10 Claims, No Drawings

METHOD FOR PREPARING POROUS METAL HYDRIDE COMPACTS

CONTRACTUAL ORIGIN OF THE INVENTION

The invention described herein was made in the course of, or under, a contract with the U.S. Department of Energy.

BACKGROUND OF THE INVENTION

This invention relates to a method for preparing porous metallic-matrix hydride compacts. More specifically, this invention relates to a method for preparing porous metallic-matrix hydride compacts which are able to withstand repeated hydriding-dehydriding cycling without disintegrating.

The utilization of hydrogen, an ideal, nonpolluting fuel, as an alternative to fossil fuels is attracting much attention. Hydrogen has been suggested as a working fluid in a closed system utilizing thermal energy from low grade heat sources to provide industrial and residential space heating. Hydrogen is also being considered for use in vehicle propulsion and in electric peak shaving systems such as fuel cells for producing electricity during peak periods of demand. The use of hydrogen as a chemical heat pump for applications in refrigeration and for upgrading low-quality heat energy is also presently under investigation however, almost any method under consideration requires a safe and effective means for the storage of the hydrogen.

The use of metal hydrides produced in a reversible chemical reaction with hydrogen provides an excellent solution to the hydrogen storage problem. Heat must be removed and supplied in order that the reactions can proceed. Hydrogen storage units consisting of sealed containers filled with a metal hydride bed and subsystems for heating, cooling and pressure control have been constructed and utilized. However, the heat transfer rate is of major concern for the effective utilization of such systems.

Thus far, only metal hydrides in the form of powder have been considered for hydrogen storage, and hydrides as powders have a very low thermal conductivity. The poor heat transfer capabilities of a powder metal hydride bed, however, is a considerable restriction on the design and construction of hydride storage systems. The metal hydride powders are generally of a fine particle size which makes it necessary to use filters to prevent the particles from being entrained in the gas stream. Furthermore, the repeated cycling causes the fine particle size to become even further reduced, causing filter congestion and increasing the pressure drop throughout the hydride bed. In most of these applications the heat transfer rate controls the hydrogen flow, so that a high hydrogen flow rate requires a high heat transfer rate. Thus complicated high-surface-area heat exchangers must be used if fast cycling is required.

Attempts have been made to improve the heat transfer capabilities of the metal hydride beds. For example, the hydrides have been placed in containers made of a highly porous metal. However, it has proved difficult to properly seal the containers of the porous metal to prevent loss of hydrogen. Other complicated heat exchanger configurations placed within a bed of the powdered metal hydrides have been tried but none have proven to be totally successful.

Hydrides compacted into porous solids supported by a thin metal matrix which does not absorb hydrogen have also been suggested. Furthermore, it has been calculated that these porous metal hydrides would show greatly improved thermal conductivity and diffusivity. The preparation of such porous metal hydrides has been tried using materials such as aluminum, nickel and copper as the binding metal matrix, by such methods as liquid-phase sintering, solidstate sintering or high-pressure compaction at room temperature. As it has turned out however, none of these methods produced a compact that was sufficiently strong to withstand the stresses arising from volume increases resulting from the formation of the metal hydrides. While absorbing hydrogen, each hydride particle imposes a compressive stress on its nearest neighbor hydride particles, which builds up to very high levels at a distance of a few coordination spheres. The binding material is not able to withstand these stresses and compacts made in this manner begin to disintegrate within one or two hydriding-dehydriding cycles, powdering the hydride and losing the enhanced heat transfer capabilities available in the porous compact.

SUMMARY OF THE INVENTION

A method has been developed for preparing porous metallic-matrix hydride compacts which are capable of being hydrided and dehydrided a number of times without the metal compact disintegrating. It has been discovered that a metal hydride which has been poisoned to prevent dehydriding, can then be compacted with a matrix metal at low temperatures to form a porous metallic-matrix compact which can be cycled many times without disintegration. By the method of the invention, a mixture is formed of a finely divided metalhydride and a finely divided matrix metal. The mixture is contacted with a poison which reacts with the hydride surface and prevent the bulk hydride from dehydriding at room temperature and atmospheric pressure. The mixture of matrix metal and poisoned metal hydride is then compressed at room temperature at a pressure sufficient for the matrix metal to flow plastically to bind the metal hydride together forming the porous metallic-matrix hydride compact.

Alternatively, the powdered metal hydride can be poisoned before being mixed with the matrix metal to form the mixture which is then compressed to form the compact.

It is therefore one object of the invention to provide a method for preparing porous metallic-matrix hydride compacts.

It is the other object of the invention to provide a method for preparing porous metallic-matrix hydride compacts which can withstand hydriding and dehydriding many times without disintegrating.

DESCRIPTION OF THE PREFERRED EMBODIMENT

These and other objects of the invention may be met by preparing a mixture of a finely divided hydridable metal such as $LaNi_5$, $LaNi_{5-x}Al_x$ ($x=0.01$ to $1.5$) or FeTi and about 7 to 30 weight percent finely divided matrix metal, such as aluminum, nickel or copper, the size of the matrix metal being from about 1 to 250 $\mu m$, comminuting the mixture to thoroughly disperse the powders and to pulverize the hydridable metal into a fine powder from about 0.1 to about 20 micron in size, contacting the comminuted mixture with hydrogen to fully hydride the hydridable metal in the mixture to the metal hydride, contacting the mixture with a hydride poison such as $SO_2$ or CO so that the metal hydride will not dehydride at room temperature and atmospheric pressure, compressing the hydrided and poisoned mixture at room temperature and at a pressure of at least $10^6$ psia, to form a compacted metallic-matrix hydride, and heating the compacted metal hydride to drive off the poison, thereby forming a compacted porous metallic-matrix hydride.

Alternatively, the finely divided metal hydride can be contacted with the hydride poison before it is mixed with the powdered matrix metal to form the mixture and compacted. Care must be taken while mixing the finely divided powders not to heat the mixture to over about 90° C. to prevent driving the poison from the metal hydrides.

The method of this invention is suitable for use with any of the metal hydrides but particularly suitable for those metal hydrides of the type $AB_5$ such as $LaNi_5$, and variations such as $LaNi_{5-x}Al_x$ where $x=0.01$ to 1.5, type ABhd 2, such as $ZrFe_2$, $ZrMn_2$ or the FeTi compounds.

The matrix metal may be any metal which is inert which will plastically deform at a relatively low pressure, which has good heat transfer characteristics and which is capable of acting as a binder for the metal hydride particles. Suitable matrix metals are aluminum, nickel and copper. The amount of matrix metal in the compact should be kept to a minimum in order to keep the hydrogen capacity as high as possible. Preferably it may range from about 7 to about 30 weight percent of the total compact. The size of the matrix metal powder is not critical, but should be relatively small such as from about 1 to 250 μm in order to maintain some porosity of the completed compact. The matrix should also be maintained generally oxide-free in order to aid compaction.

The poisoned hydride or hydridable metal and matrix metal should be thoroughly dispersed in each other to form a good mixture. If necessary the mixture may be comminuted by any appropriate means, such as by ball milling which will provide a good mixture of both materials and which will also act to reduce the hydridable metal to a very fine powder, preferably no larger than about 20 microns and down to as small as about 0.1 micron. It may be desirable to wet the powder with alcohol to prevent oxidation of the hydride if it is exposed to the ambient atmosphere.

The finely divided hydridable metal or mixture of hydridable metal and matrix metal may be hydrided by contact with hydrogen gas at a pressure sufficient to fully hydride the hydridable metal. Generally a pressure from about 100 to about 500 psi has been found satisfactory to accomplish this, although higher hydrogen pressures may be necessary. It is important that the hydridable metal be fully hydrided in order that the metal be fully expanded when compacted to prevent the compact formed from later disintegrating due to volume expansion of the hydridable metal.

The hydrided metal may be contacted by any suitable hydride poison such as $SO_2$ or CO to prevent the metal hydride from dehydriding at room temperature and at atmospheric pressure. Generally a gas pressure of about 30 to 120 psi for 1 to 5 minutes has proven satisfactory to adequately poison the metal hydride.

The poisoned metal hydride and matrix metal mixture may then be compressed by any suitable compacting means at room temperature and at a sufficient pressure for the matrix metal to flow plastically to bind the metal hydride particles together to form a compact. Generally pressures of about 360 kpsi have been found satisfactory, although pressures on up to $10^6$ psi would be preferred in order to prevent the compact from later disintegrating due to internal pressures of hydrogen.

Once the compact has been formed it can be activated by heating it to a temperature of about 100° C. in order to dehydride the metal and drive off the poison. One advantage of the method of this invention is that once the poison has been removed, the compact is active and does not require reactivation as do compacts prepared by other methods.

EXAMPLE I

About 11 g of finely divided $LaNi_5$ powder about 1 to 20 μm in size was mixed with 20 weight percent fine aluminum powder, 44 μm in size or smaller. The mixture was comminuted in a ball mill for about 10 hours until intimately mixed. The mixture was removed from the ball mill, placed in a reactor and contacted with hydrogen at 100 psi for about 5 minutes until the $LaNi_5$ was completely hydrided. CO at 33 psi was then admitted to the reactor for 3 one-minute exposures to poison the hydride. The poisoned powdered mixture was then compacted using a small amount of alcohol as a lubricant at 300 kpsi and at room temperature to form compacts about 0.375" diameter and ¼ to ½" in height. The compacts were heated to about 100° C. to drive off the poison and the remaining hydrogen. The compacts were then placed into a glass reactor which was evacuated and hydrogen admitted at about 200 psi. The pellets rapidly absorbed hydrogen up to $LaNi_5H_6$. The pellets were cycled (repeatedly loaded and evacuated) up to 9 times without any visible spalling occuring.

EXAMPLE II

Fine $LaNi_5$ hydride powder about 1-20 μm in diameter prepared by repeatedly absorbing and desorbing hydrogen. The hydride was left in the fully absorbed state ($LaNi_5H_x \geq 6$) and then poisoned by admitting $SO_2$ at 34 psi pressure for 5 minutes, after the excess hydrogen was let out of the reactor. The poisoned powder was wetted with alcohol which was added to the reactor. The wet hydride powder was removed from the reactor and mixed (in alcohol) by means of a ball mill with 26% weight percent aluminum powder screened through a #60 mesh.

The poisoned mixed powder was compacted in a 0.375" diameter die at ~360 kpsi at room temperature. The alcohol served as a lubricant for the compaction of the powder. Pellets of ~0.375" diameter and ¼-½" height were produced. The pellets were put into a glass reactor and evacuated, then hydrogen was admitted at ~200 psi at room temperature. The pellets rapidly absorbed hydrogen up to $LaNi_5H_6$. Some pellets were cycled (repeatedly loaded and evacuated) up to ~14 times before any visible spalling occurred.

EXAMPLE III

About 12.30 g $LaNi_5$ fine powder from 1-20 μm was mixed with 27.42 weight percent fine (1-10 μm) copper powder and the mixture ball milled for 16 hours until intimately mixed. The mixture was removed from the ball mill, placed in a reactor and contacted with hydrogen at about 100 psi for 5 minutes until the $LaNi_5$ was completely hydrided. The hydrided mixture was then contacted with $SO_2$ for 3 one-minute exposures to poison the hydrides. A portion of the poisoned mixture was then compacted at about 360 kpsi to form compacted pellets.

Thus it can be seen from the preceding discussion and Examples that the invention provides a method for preparing porous metallic-matrix hydride compacts which can be hydrided and dehydrided many times without destroying the compact.

The embodiments of the invention in which an exclusive property or privilege is claimed are defined as follows:

1. A method for preparing a porous metallic-matrix hydride compact comprising:
   forming a mixture of a finely divided, fully hydrided metal hydride and a finely divided matrix metal the matrix metal being an oxide-free, plastically deformable metal capable of binding the metal hydride, the mixture containing matrix metal in an amount sufficient to bind the metal hydride;
   thoroughly dispersing the metal hydride and the matrix metal in each other to form an intimate mixture;
   contacting the initimate mixture with a hydride poison to prevent the hydride from dehydriding at room temperature and atmospheric pressure; and
   compressing the mixture of matrix metal and poisoned metal hydride at room temperature and at a pressure sufficient for the matrix metal to flow plastically to bend the metal hydride together while maintaining the mixture at a temperature below 90° C., thereby forming a porous metallic matrix hydride compact.

2. The method of claim 1 wherein the mixture is formed by mixing a finely divided hydridable metal and a finely divided matrix metal, and including the additional step of:
   contacting the intimate mixture with hydrogen under sufficient pressure to fully hydride the hydridable metal to form a mixture of a metal hydride and a matrix metal.

3. The method of claim 2 wherein the mixture contains from about 7 to about 30 weight percent of matrix metal, and the matrix metal is selected from the group consisting of aluminum, nickel and copper.

4. The method of claim 3 wherein the hydridable metal selected from the group consisting of the $LaNi_5$, $LaNi_{5-x}Al_x$ (x=0.01 to 1.5) and FeTi.

5. The method of claim 4 wherein the metal hydride is poisoned by contact with a gas selected from the group consisting of $SO_2$ and CO.

6. The method of claim 1 wherein the mixture is formed of a finely divided poisoned metal hydride and contains from about 7 to about 30 weight percent of matrix metal selected from the group consisting of aluminum, nickel and copper.

7. The method of claim 6 wherein the poisoned metal hydride is selected from the group consisting of $LaNi_5$, $LaNi_{5-x}Al_x$ (x=0.01 to 1.5) and FeTi.

8. The method of claim 1 wherein the mixture contains from about 7 to about 30 weight percent of matrix metal, and the matrix metal is selected from the group consisting of aluminum, nickel and copper.

9. The method of claim 8 wherein the hydridable metal selected from the group consisting of the $LaNi_5$, $LaNi_{5-x}Al_x$ (x=0.01 to 1.5) and FeTi.

10. The method of claim 9 wherein the metal hydride is poisoned by contact with a gas selected from the group consisting of $SO_2$ and CO.

* * * * *